United States Patent [19]

Haller

[11] Patent Number: 5,583,419
[45] Date of Patent: Dec. 10, 1996

[54] POWER SUPPLY SYSTEMS

[75] Inventor: Jeremy P. Haller, Cheltenham, England

[73] Assignee: Smiths Industries Public Limited Company, London, England

[21] Appl. No.: 433,559

[22] Filed: May 3, 1995

[30] Foreign Application Priority Data

Jun. 18, 1994 [GB] United Kingdom ............... 9412287

[51] Int. Cl.$^6$ ....................................................... H02J 1/00
[52] U.S. Cl. ............................... 322/8; 322/45; 364/492; 307/19; 307/29
[58] Field of Search ........................ 322/8, 18, 24, 322/33, 34; 307/31, 32, 34, 38, 57; 364/492, 494

[56] References Cited

U.S. PATENT DOCUMENTS

| | | | |
|---|---|---|---|
| 3,842,249 | 10/1974 | Geyer et al. | 235/151.21 |
| 4,216,384 | 8/1980 | Hurley . | |
| 4,321,645 | 3/1982 | Thom et al. | 361/63 |
| 4,403,292 | 9/1983 | Ejzak et al. | 364/492 |
| 4,819,180 | 4/1989 | Hedman et al. | 364/492 |
| 4,967,096 | 10/1990 | Diemer et al. | 307/19 |
| 5,325,043 | 6/1994 | Parro | 322/23 |
| 5,422,517 | 6/1995 | Verney et al. | 307/29 |

FOREIGN PATENT DOCUMENTS 1545006  4/1979  United Kingdom .

Primary Examiner—Thomas M. Dougherty
Assistant Examiner—Nicholas Ponomarenko
Attorney, Agent, or Firm—Pollock, Vande Sande & Priddy

[57] ABSTRACT

A power supply system for controlling supply of power to several inductive loads has a power monitor and a processor that determines when power consumed exceeds the capacity of the system. When overload is detected, hardware rapidly disconnects loads of low priority. A software register is loaded with software controlling staggered reconnection of the loads when power capacity becomes sufficient again. If capacity is sufficient, all the loads may be reconnected at the same time.

2 Claims, 2 Drawing Sheets

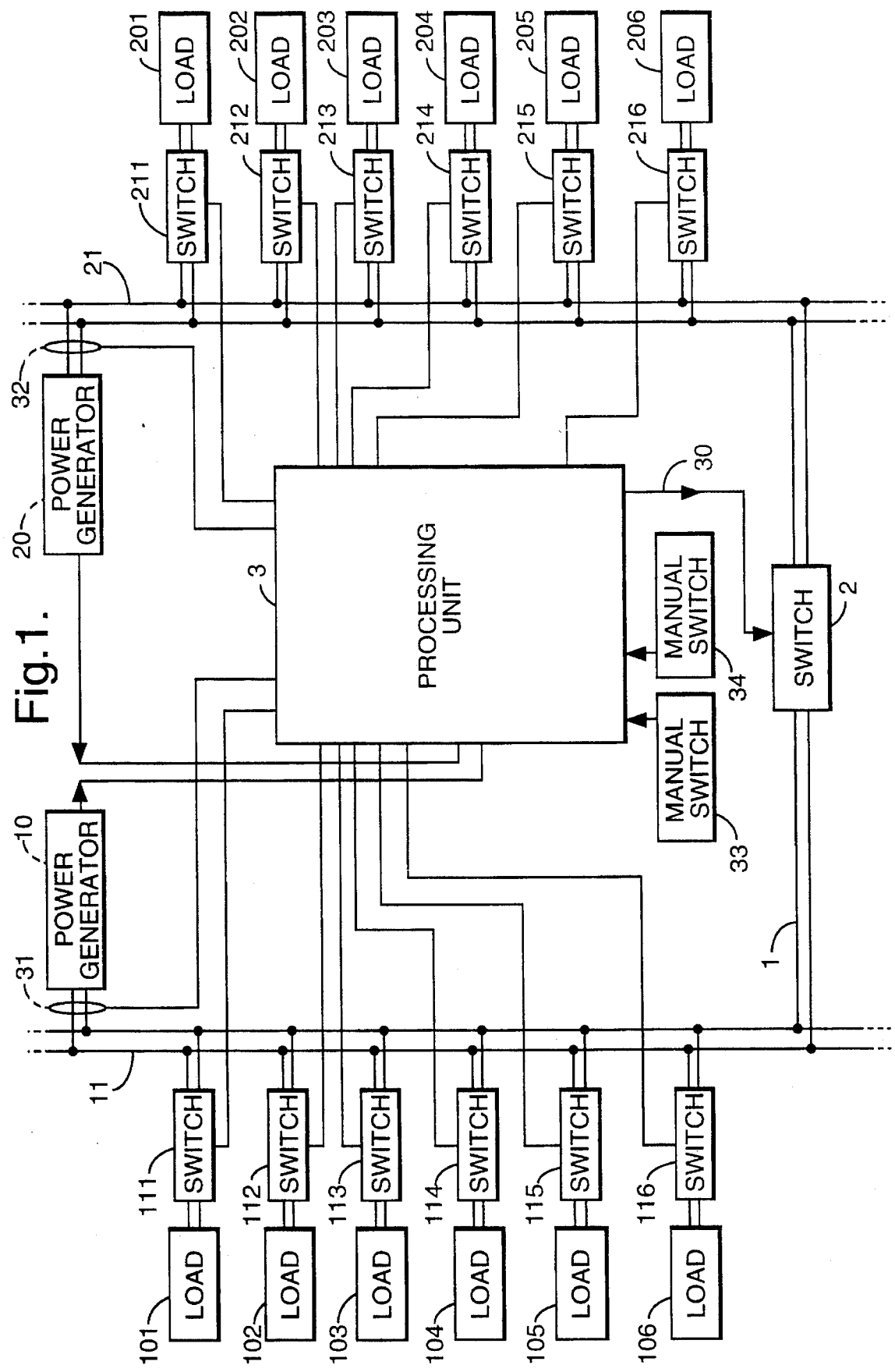

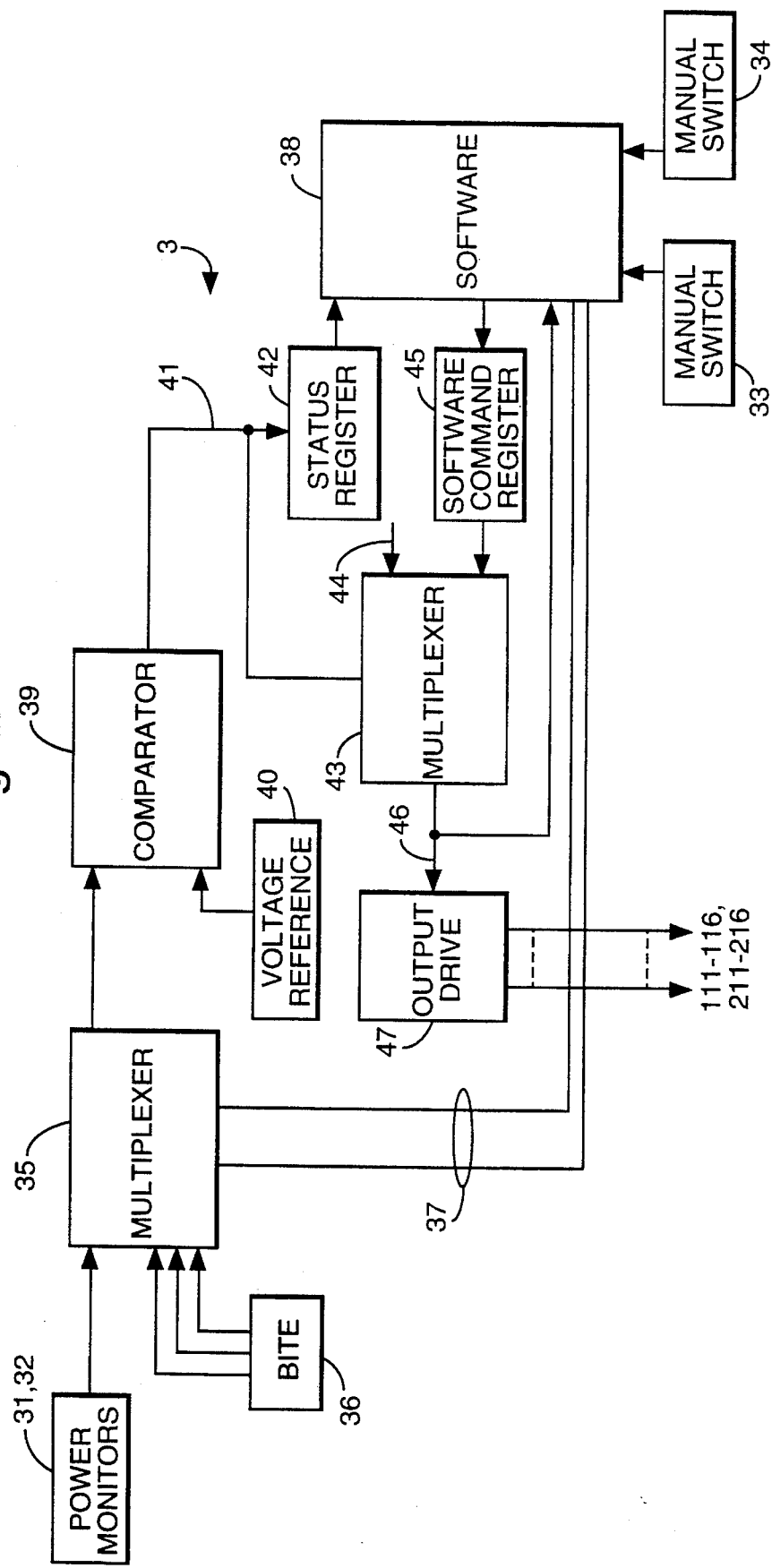

POWER SUPPLY SYSTEMS

BACKGROUND OF THE INVENTION

This invention relates to power supply systems.

The invention is more particularly, but not exclusively, concerned with power supply systems for aircraft.

In an aircraft a.c. power supply system there is only a limited amount of power available from the aircraft generators. Inductive loads such as fans and pumps tend to draw high currents when first switched on, before settling to a lower steady value. When several of these loads are turned on at the same time, large and damaging currents can be drawn unless measures are taken to avoid this. One way of reducing the risk of damage is to increase the generator capacity but this leads to a consequent increase in the size, weight and expense of the generators. Alternatively, the system can be arranged to stagger the starting of large loads, and in particular, large inductive loads, such as hydraulic pumps.

Conventional systems have fixed time delay relays associated with the highly inductive loads. Each time delay is made different, with the highest priority loads having the shortest delays. In this way, if all the loads are commanded on simultaneously, the most important loads will be started first and the less important loads will be started after longer intervals. The problem with this arrangement, however, is that, if a low priority load is commanded on by itself, there will be a relatively long and unnecessary delay before power is supplied to the load. Also, the arrangement does not entirely remove the risk that power could be supplied to several large inductive loads at the same time. For example, three hydraulic pumps A, B and C could be given different delays so that if switches controlling the operation of the three pumps were switched on at the same time, power would be supplied first to pump A, then to pump B and finally to pump C. However, if the switches controlling the pumps were turned on separately, one after the other, in the order C, B, A, this would reduce the time delay between power being supplied to the pumps and could lead to overloading of the generators.

Also, when the power source is only lightly loaded, it may not be necessary to stagger the switching of loads. If the system has lost one power source it will usually be necessary to stagger the application of loads onto the remaining power source, whereas, when both sources are operating, this may not be necessary. Current systems, however, are not sufficiently adaptable and cause staggering of the loads even when this may not be necessary.

BRIEF SUMMARY OF THE INVENTION

It is an object of the present invention to provide an improved power supply system.

According to one aspect of the present invention there is provided a power supply system including a power supply, a plurality of loads, a plurality of switches connecting each respective one of the loads to the power supply, and processor means for controlling the operation of the switches, the processor means being arranged to delay closing of said switches when power is to be supplied to several of said loads such that there is a time delay between different ones of the loads being supplied with power, and the time delay for each load being variable such that the delay differs according to which combination of loads is to be supplied with power.

The system preferably includes a power monitor arranged to monitor the power consumed by the loads, means for detecting when the power consumed exceeds the capacity of the power supply, and hardware means for disconnecting a load when power consumed exceeds power supply capacity. The system may include means for supplying the contents of a software store to control reconnection of a load when power consumed becomes less than power supply capacity. The system may also include means for loading the software store with either software enabling supply of power to all the loads together or software for staggering reconnection of the loads. The software is preferably arranged to reconnect load without delay when there is sufficient power supply capacity. The system may include a software command register containing software information for control of reconnection of load, an output drive unit and a multiplexer having two inputs, one input of the multiplexer being connected to an output of the software command register, another input being connected to an off signal input, and the multiplexer being switched to supply the off signal to the output drive unit so as to turn off a load when the power consumption exceeds the capacity of the power supply and to switch the software information to the output drive unit when load is to be reapplied.

According to another aspect of the present invention there is provided a method of controlling connection and disconnection of a plurality of loads in a power supply system according to changes in the relationship between power consumption and the capacity of a power supply in the system, the method including the steps of monitoring the power consumption of the system, detecting when the consumption exceeds capacity, disconnecting load if consumption exceeds capacity, reconnecting load when capacity exceeds consumption and introducing a variable delay after connection of an inductive load before another load is connected.

The delay may be varied according to the inductive properties of the loads. Consumption exceeding capacity is preferably detected by hardware so that load can be disconnected rapidly, the delay of connecting a load after connection of an inductive load being controlled by software. Preferably, commanding a load to be powered only causes powering of the load after a delay sufficient to enable disconnection of another, lower priority, load when there is insufficient power available in the system.

An aircraft power supply system according to the present invention, will now be described, by way of example, with reference to the accompanying drawings.

BRIEF DESCRIPTION OF THE DRAWINGS

FIG. 1 shows the system schematically; and

FIG. 2 shows a part of the system diagrammatically.

DETAILED DESCRIPTION OF THE PREFERRED EMBODIMENT

The power supply system has two a.c. power generators 10 and 20 connected to respective power buses 11 and 21. The buses 11 and 21 are electrically isolated from one another but can be interconnected via a tie 1 and a switch 2.

The system also includes various loads in the form of items of electrical equipment, of which only twelve are shown, six items 101 to 106 being connected to the left-hand bus 11 and the remaining six items 201 to 206 being connected to the right-hand bus 21. Each item of equipment is connected to its respective bus 11 or 21 via a respective relay or other remotely-controlled switch 111 to 116 and 211 to 216. Each relay is connected to a processing unit 3, which provides appropriate control to maintain the relays open (off) or closed (on) as desired. The processing unit 3 is also connected via line 30 to the tie switch 2 to control operation of this switch. The processing unit 3 receives various inputs, such as from power monitors 31 and 32 connected to the two respective buses 11 and 21, and from manually-operable switches 33 and 34.

With reference now also to FIG. 2, the processing unit 3 includes a 4:1 multiplexer 35, which receives an output from the power monitors 31 or 32 and three inputs from BITE 36 (built-in test equipment). The power monitors 31 and 32 each take the form of a monitor that derives a voltage proportionally from the power supply bus feeding the loads. The multiplexer 35 also receives mode select inputs on lines 37 from software indicated by the numeral 38. The inputs on lines 37 instruct the multiplexer 35 to pass one of the inputs from the power monitors or BITE to a comparator 39. The comparator 39 also receives an input from a voltage reference source 40 and provides an output on line 41 indicative of whether or not power is available. The output on line 41 is supplied via a status register 42 to the software 38 and to the control input of a 2:1 multiplexer 43. The multiplexer 43 receives two inputs, one being an OFF signal on line 44 and the other being the output of a software command register 45 that contains instructions supplied to it from the software 38.

The output of the multiplexer 43 is supplied via line 46 to an output drive unit 47 by which the relays 111 to 116 and 211 to 216 are controlled.

In normal operation, all the relays 111 to 116 and 211 to 216 are on so that any of the items of electrical equipment can be in operation if selected. In practice, the power supply of the aircraft need not be sufficient to power all the items of equipment because not all the items of equipment are in operation at any one time. In these circumstances, the power monitors 31 and 32 sense that the power drawn by the loads in operation is below the maximum capacity, and the comparator 39 provides an output on line 41 indicating that power is available for additional loads if required. This causes the multiplexer 43 to supply the output of the software command register 45 to the output drive 47, which enables all the relays.

During normal operation, all highly inductive loads, such as hydraulic pumps, are stagger started with a software-configurable delay between each start. An initial delay is applied prior to powering the first load, in order to give time for other, lower priority, loads to be shed, if necessary, to prevent the generators being overloaded. The processing unit 3 continually assesses the power available in the system and, as soon as the user commands another load to be connected, such as by actuating one of the switches 33 or 34, the processing unit 3 determines whether or not sufficient power is available. If insufficient power is available, the delay enables the system to shed lower priority loads before power is supplied to the new load. If there is sufficient power available for the new load, the delay before it is powered is zero. The second load is powered with a delay after powering of the first load. The processing system computes this delay with knowledge of the inductive properties of the individual loads so that the delay is minimal but allows sufficient time for the current surge on starting to decay. The time delay for each load is variable according to which combination of loads is to be supplied with power. For example, three identical inductive loads A, B and C might be commanded on at the same time but the sequence might typically be: A-1 ms after command, B-2 ms after command, and C-3 ms after command. However, if the loads were commanded on by pressing switches associated with the loads in the sequence C, B, A, the delays might be: C-1 ms after its command, B-1 ms after its command, and A-1 ms after its command. In this way, the delays are kept to a minimum without there being a risk of excessive power consumption.

If a power interrupt should occur, such as caused by the failure of one of the generators 10 or 20, the output of the comparator 39 changes to indicate that power is no longer available. The change in the output on line 41, therefore, causes the multiplexer 43 to supply the OFF signal on line 44 to the output drive unit 47. This turns off those relays 111 to 116 and 211 to 216 associated with items of equipment that have a low priority, that is, those items of equipment that can be shut down without impairing the ability of the aircraft to fly safely. When the interrupt occurs, the hardware removes the power from the load with zero delay, thereby avoiding the delays inevitable with software control. If the power interrupt is only short, this is detected by the hardware in the processing unit 3 and indicated to the software 38 by a short duration pulsed input. This pulse is latched at the hardware-software interface until it is read and cleared by the software. The status register 42 is also changed to indicate to the software 38 that a power interrupt has occurred. The software 38 responds to this by reloading the software command register 45 with a stagger start program for when power is subsequently available. There is no need for a delay after turning on power to a non-inductive load because it draws a steady current rather than an initially high current.

If the failed generator should later come back into operation, the comparator 39 signals that power is available and switches the multiplexer 43 to supply the contents of the software command register 45 to the output drive unit 47. The items of equipment that were previously powered are then stagger started.

The system of the present invention enables the starting of loads with a minimum delay while also ensuring that there is no risk of several inductive loads being started without a sufficient delay between them.

Where there is sufficient power available for the required loads to be connected without the need to stagger their connection, the system is able to recognize this and connect all the required loads at the same time, thereby minimizing the time for which loads are disconnected.

What I claim is:

1. A power supply system comprising: a power supply; a plurality of loads; a plurality of switches connecting each respective one of the loads to the power supply; and a processor controlling the operation of the switches, the processor delaying closing of said switches when power is to be supplied to several of said loads such that there is a time delay between different ones of said loads being supplied with power, the time delay for each said load being variable such that the delay differs according to which combination of said loads is to be supplied with power, said processor including a software store, said processor supplying the contents of said software store to control reconnection of at least one of said loads when power consumed becomes less than power supply capacity, said processor also including a software command register containing software information for control of reconnection of load, an output drive unit, a multiplexer having two inputs, an off signal input, a connection between one of said inputs of said multiplexer and an output of said software command register, and a connection between the other of said inputs and said off signal input, said processor being operative to switch the multiplexer to supply the off signal to said output drive unit so as to turn off a load when the power consumption exceeds the capacity of the power supply and being operative to switch the software information to said output drive unit when load is to be reapplied.

2. A power supply system according to claim 1, wherein the system includes a power monitor for monitoring the power consumed by said loads, and a connection between said power monitor and said processor.

* * * * *